(12) United States Patent
Abhyankar et al.

(10) Patent No.: US 10,697,342 B2
(45) Date of Patent: Jun. 30, 2020

(54) RESONANT MIXERS FOR REDUCING REDUCTANT DEPOSITS

(71) Applicant: CUMMINS EMISSION SOLUTIONS INC., Columbus, IN (US)

(72) Inventors: Atul S. Abhyankar, Columbus, IN (US); Ronald Hale, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 16/168,298

(22) Filed: Oct. 23, 2018

(65) Prior Publication Data

US 2019/0203626 A1     Jul. 4, 2019

Related U.S. Application Data

(60) Provisional application No. 62/612,786, filed on Jan. 2, 2018.

(51) Int. Cl.
*F01N 13/00* (2010.01)
*F01N 3/28* (2006.01)
(Continued)

(52) U.S. Cl.
CPC ........... *F01N 3/2892* (2013.01); *F01N 3/208* (2013.01); *F01N 3/2066* (2013.01);
(Continued)

(58) Field of Classification Search
CPC ............... F01N 3/2892; F01N 2240/20; F01N 2290/08; F01N 2330/38
See application file for complete search history.

(56) References Cited

U.S. PATENT DOCUMENTS

| 9,617,892 B2 | 4/2017 | Ly et al. |
| 9,644,516 B1 | 5/2017 | Chiruta et al. |

(Continued)

FOREIGN PATENT DOCUMENTS

| DE | 102007012790 A1 * | 9/2008 | .......... B01F 3/04049 |
| JP | 2010180780 A *    | 8/2010 | |

OTHER PUBLICATIONS

Machine translation of JP-2010180780-A, accessed Dec. 9, 2019. (Year: 2019).*

(Continued)

*Primary Examiner* — Jonathan R Matthias
(74) *Attorney, Agent, or Firm* — Foley & Lardner LLP

(57) ABSTRACT

An aftertreatment system includes: a selective catalytic reduction system including at least one catalyst for decomposing constituents of an exhaust gas produced by an engine, the exhaust gas having a pressure pulsation frequency; an exhaust conduit fluidly coupled to the selective catalytic reduction system and structured to deliver the exhaust gas to the selective catalytic reduction system from the engine; at least one mixer positioned in the exhaust conduit; and a reductant insertion assembly fluidly coupled to the exhaust conduit and structured to insert a reductant into the exhaust conduit upstream of the at least one mixer. The at least one mixer is structured to have a natural frequency matching the pressure pulsation frequency so as to cause resonant vibration in the at least one mixer, the resonant vibration causing reductant deposits to be removed from the at least one mixer.

15 Claims, 10 Drawing Sheets

(51) Int. Cl.
*F01N 3/20* (2006.01)
*F01N 13/10* (2010.01)
(52) U.S. Cl.
CPC ......... *F01N 13/008* (2013.01); *F01N 13/102* (2013.01); *F01N 2240/20* (2013.01); *F01N 2260/16* (2013.01); *F01N 2610/02* (2013.01); *F01N 2610/14* (2013.01); *F01N 2900/1406* (2013.01)

(56) References Cited

U.S. PATENT DOCUMENTS

| | | | | |
|---|---|---|---|---|
| 2009/0165447 A1* | 7/2009 | Hiranuma | ............... | F01N 3/106 60/295 |
| 2014/0345257 A1* | 11/2014 | Levin | .................... | F01N 13/009 60/274 |
| 2017/0022869 A1* | 1/2017 | Ly et al. | ............... | B01F 5/0268 |

OTHER PUBLICATIONS

Machine translation of DE-102007012790-A1, accessed Dec. 9, 2019 (Year: 2019).*

* cited by examiner

RESONANT MIXERS FOR REDUCING REDUCTANT DEPOSITS

CROSS-REFERENCE TO RELATED APPLICATIONS

The present application claims the benefit of U.S. Provisional Application No. 62/612,786, filed Jan. 2, 2018, the disclosure of which is hereby incorporated by reference herein in its entirety.

TECHNICAL FIELD

The present disclosure relates generally to aftertreatment systems for use with internal combustion (IC) engines.

BACKGROUND

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) system which includes a catalyst formulated to convert NOx (NO and $NO_2$ in some fraction) into harmless nitrogen gas ($N_2$) and water vapor ($H_2O$) in the presence of ammonia ($NH_3$).

Generally, a reductant such as a diesel exhaust fluid (e.g., an aqueous urea solution) is inserted into the aftertreatment system as a source of ammonia. The reductant facilitates the decomposition of the constituents of the exhaust gas by the catalyst included in the SCR system. The delivery of the reductant into conduits of the aftertreatment system is generally assisted by the exhaust gas flow to achieve efficient mixing of the reductant with the exhaust gas and reduce reductant deposits. To enhance mixing of the reductant with the exhaust gas, mixers are often placed in the flow path of the exhaust gas. However, the mixers also serve as sites where reductant deposits tend to form and build up over time. Such reductant deposits can clog the mixers, which can reduce mixing efficiency as well as reduce flow rate increasing backpressure on the exhaust gas flowing through the aftertreatment system.

SUMMARY

Embodiments described herein relate generally to systems and methods for removing reductant deposits from aftertreatment systems, and in particular to mixers that have a natural frequency matching a pressure pulsation frequency of the exhaust gas flowing through the aftertreatment system. The matching frequencies results in resonance vibration in the mixer causing reductant deposits to be removed from the mixers.

In some embodiments, an aftertreatment system comprises a SCR system including at least one catalyst for decomposing constituents of an exhaust gas produced by an engine. The exhaust gas has a pressure pulsation frequency. An exhaust gas conduit is fluidly coupled to the SCR system and structured to deliver the exhaust gas to the SCR system from the engine. At least one mixer is positioned in the exhaust conduit. A reductant insertion assembly is fluidly coupled to the exhaust conduit and structured to insert a reductant into the exhaust conduit upstream of the at least one mixer. The at least one mixer is structured to have a natural frequency matching the pressure pulsation frequency of the exhaust gas so as to cause resonant vibration in the at least one mixer. The resonant vibration causes reductant deposits to be removed from the at least one mixer.

In some embodiments, an apparatus comprises an exhaust conduit configured to be fluidly coupled to a SCR system for delivering an exhaust gas thereto. At least one mixer is positioned in the exhaust conduit and is configured to facilitate mixing of a reductant with the exhaust gas. The at least one mixer is structured to have a natural frequency matching a pressure pulsation frequency of the exhaust gas so as to cause resonant vibration in the at least one mixer, the resonant vibration causing reductant deposits to be removed from the at least one mixer.

In some embodiments, a method comprises determining a pressure pulsation frequency of an exhaust gas produced by an engine; structuring at least one mixer to have a natural frequency matching the pressure pulsation frequency; and positioning the at least one mixer in an exhaust conduit configured to receive the exhaust gas. The pressure pulsation frequency of the exhaust gas causes resonant vibration in the at least one mixer, the resonant vibration causing reductant deposits to be removed from the at least one mixer.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
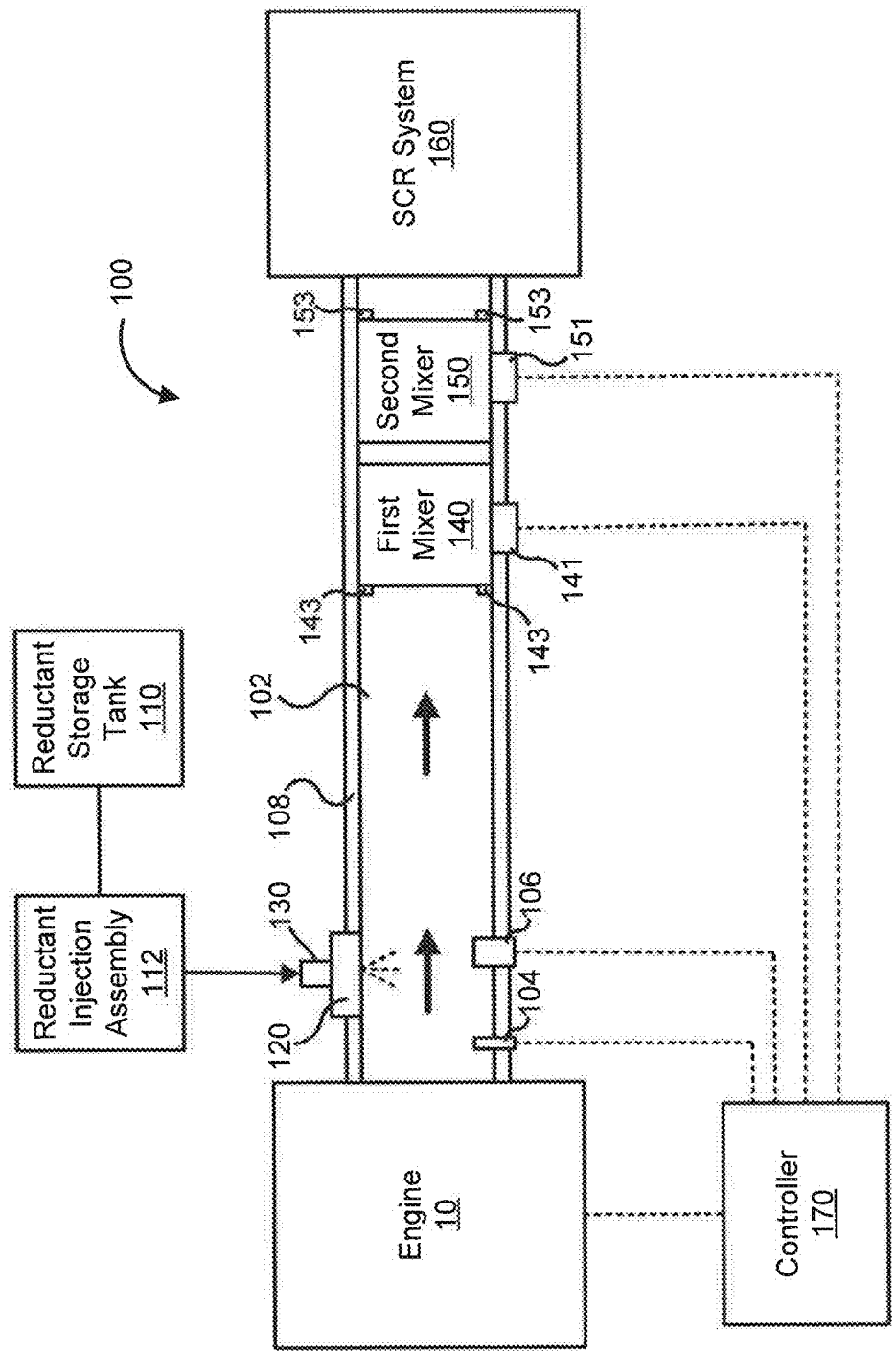
FIG. 1 is a schematic illustration of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for removing reductant deposits from aftertreatment systems, and in particular to mixers that have a natural frequency matching a pressure pulsation frequency of the exhaust gas flowing through the aftertreatment system. The matching frequencies results in resonance vibration in the mixer causing reductant deposits to be removed from the mixers.

Generally, a reductant such as a diesel exhaust fluid (e.g., an aqueous urea solution) is inserted into the aftertreatment system as a source of ammonia. The reductant facilitates the decomposition of the constituents of the exhaust gas by the catalyst included in the SCR system. The delivery of the reductant into conduits of the aftertreatment system is generally assisted by the exhaust gas flow to achieve efficient mixing of the reductant with the exhaust gas and reduce reductant deposits. To enhance mixing of the reductant with the exhaust gas, mixers are often placed in the flow path of the exhaust gas. However, the mixers also serve as sites where reductant deposits tend to form and build up over time. Such reductant deposits can clog the mixers, which can reduce mixing efficiency as well as reduce flow rate increasing backpressure on the exhaust gas flowing through the aftertreatment system.

Embodiments of the exhaust conduit including the resonant mixers described herein provide benefits including, for example: (1) allowing removal of reductant deposits from the mixers by using the natural phenomenon of resonance; (2) reducing accumulation of reductant deposits; (3) maintaining mixing efficiency of mixers; and (4) reducing maintenance costs.

As described herein, the term "pressure pulsation frequency" of the exhaust gas refers to the frequency of fluctuations in the pressure head of the exhaust gas produced by an engine, that is the number of pulses of the exhaust gas produced per second.

As described herein, the term "matching" refers to overlapping (e.g., being exactly the same or being within error bounds) of a natural frequency with a pressure pulsation frequency or an induced frequency.

FIG. 1 is a schematic illustration of an aftertreatment system 100 according to an embodiment. The aftertreatment system 100 is configured to receive an exhaust gas (e.g., a diesel exhaust gas) from an engine 10 (e.g., a diesel engine, a gasoline engine, a natural gas engine, a biodiesel engine, a dual-fuel engine, etc.) and decompose constituents (e.g., NOx gases) included in the exhaust gas produced by the engine 10. The aftertreatment system 100 includes an exhaust conduit 102, a mounting plate 120, an SCR system 160, a first mixer 140, and optionally a second mixer 150.

The exhaust gas produced by the engine 10 has a pressure pulsation frequency dependent on the engine 10 operating parameters. In some embodiment, the pressure pulsation frequency may comprise a combustion order frequency of the engine 10. The combustion order frequency is carried naturally within the exhaust gas, and is dependent on the engine 10, for example, depending on the number of cylinders, firing order, engine speed of the engine 10, etc.

In other embodiments, the pressure pulsation frequency may also comprise a vortex shedding frequency (Vortex Karmen Street frequency), which may be generated by providing obstacles in the flow path of the exhaust gas (e.g. in the exhaust conduit 102). This is an aerodynamically (exhaust gas flow) induced frequency which has sufficient energy and predictability within a range of Reynold's numbers to generate a tuned frequency for resonance purposes. Vortex shedding frequency may generate a higher frequency than the combustion order frequency. In some embodiments, a frequency generating structure 106, for example, ribs, vanes or other structures may be provided in the exhaust conduit 102 upstream of the first mixer 140 so as to generate vortex shedding frequency in the exhaust gas. In other embodiments, the first mixer 140, and/or the second mixer 150 may be designed to generate vortex shedding frequency in the exhaust gas.

In still other embodiments, the pressure pulsation frequency may comprise a mechanically induced frequency, for example generated using a mechanical actuator, as described herein. The mechanical actuator may be operably coupled to the exhaust conduit 102, the first mixer 140 and/or the second mixer 150.

The SCR system 160 includes one or more catalysts formulated to selectively reduce the exhaust gas. Any suitable catalyst can be used such as, for example, platinum, palladium, rhodium, cerium, iron, manganese, copper, vanadium based catalyst, any other suitable catalyst, or a combination thereof. The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The exhaust gas (e.g., diesel exhaust gas) can flow over and about the catalyst such that any NOx gases included in the exhaust gas are further reduced to yield an exhaust gas which is substantially free of carbon monoxide, and NOx gases.

While shown as including the SCR system 160, the aftertreatment system 100 can also include other components, for example, a particulate filter, an oxidation catalyst (e.g., a diesel oxidation catalyst or an ammonia oxidation catalyst), temperature sensors, oxygen sensors, NOx sensors, ammonia sensors, and/or any other components.

The exhaust conduit 102 is fluidly coupled to the SCR system 160 and the engine 10. The exhaust conduit 102 can include a metallic (e.g., aluminum, stainless steel, iron, alloys, etc.) pipe or tube and is structured to deliver the exhaust gas from the engine 10 to the SCR system 160. For example, the exhaust conduit 102 can be fluidly coupled to an exhaust manifold (not shown) of the engine 10 to receive the exhaust gas produced by the engine 10. FIG. 1 shows a single exhaust conduit 102 fluidly coupled to the engine 10. In other embodiments, a plurality of exhaust conduit 102 can be fluidly coupled to the engine 10. For example, the aftertreatment system 100 can have multiple banks with each bank including the exhaust conduit 102, the SCR system 160 and any other components described herein.

An exhaust conduit opening may be defined on the sidewall of the exhaust conduit 102 within which a mounting plate 120 is positioned. The mounting plate 120 can be coupled to the exhaust conduit opening defined in the exhaust conduit 102 using any suitable coupling mechanism, for example, welded (e.g., arc welded, spot welded, gas welded, heat welded, etc.), fusion bonded, joined with an adhesive or snap-fit or coupled using fasteners (e.g., screws, bolts, rivets, etc.). The coupling of the mounting plate 120 to the sidewall of the exhaust conduit 102 forms a substantially leak tight seal so that the exhaust gas cannot escape from the joint between the mounting plate 120 and the exhaust conduit opening of the exhaust conduit 102. Examples of the mounting plate 120 are described in U.S. patent application Ser. No. 14/885,573, filed Oct. 16, 2015, now U.S. Pat. No. 9,644,516, and entitled "Mounting Plate for Mounting Injectors and Directing Reductant Flow in Exhaust Conduits," the entire disclosure of which is incorporated herein by reference.

As used herein, the term "leak tight" is understood to encompass both a hermetic seal (i.e., a seal that is gas-impervious) as well as a seal that is liquid-impervious. The term "substantially" when used in connection with "leak tight" is intended to convey that, while total fluid imperviousness is desirable, some minimal leakage due to manufacturing tolerances, or other practical considerations (such as, for example, the pressure applied to the seal and/or within the fluid), can occur even in a "substantially fluid-tight" seal. In other embodiments, the mounting plate 120 can be monolithically formed with the exhaust conduit 102.

In some embodiments, the mounting plate 120 may comprise a mounting plate opening and a pair of fluid channels for inserting reductant into the exhaust gas flowing through the exhaust conduit 102. In other embodiments, the mounting plate 120 may include a plurality of mounting plate openings (e.g., 2, 3, 4 or even more), and a plurality of fluid channels.

An injector 130 (e.g., the injectors 230a/b/c, or other reductant insertion unit) may be positioned on the mounting plate 120 (e.g., coupled using a fastener). The injector 130 is configured to receive a reductant from a reductant storage tank 110 via a reductant insertion assembly 112. The reductant storage tank 110 is structured to store the reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water, or 40% by volume of urea and 60% by volume of deionized water.

The reductant insertion assembly 112 is fluidly coupled to the reductant storage tank 110. In some embodiments, the reductant insertion assembly 112 may be configured to selectively insert the reductant into the exhaust conduit 102 via the injector 130. The reductant insertion assembly 112 may comprise various structures to facilitate receiving the reductant from the reductant storage tank 110, and delivery to the exhaust conduit 102 through the mounting plate 120.

For example, the reductant insertion assembly 112 may comprise one or more pumps having filter screens (e.g., to prevent solid particles of the reductant or contaminants from flowing into the pump) and/or valves (e.g., check valves) positioned upstream thereof to receive reductant from the reductant storage tank 110. In some embodiments, the pump may comprise a diaphragm pump but any other suitable pump may be used such as, for example, a centrifugal pump, a suction pump, etc.

The pump may be configured to pressurize the reductant so as to provide the reductant to the exhaust conduit 102 at a predetermined pressure. Screens, check valves, pulsation dampers, or other structures may also be positioned downstream of the pump to provide the reductant to the exhaust conduit 102. In various embodiments, the reductant insertion assembly 112 may also comprise a bypass line structured to provide a return path of the reductant from the pump to the reductant storage tank 110.

A valve (e.g., an orifice valve) may be provided in the bypass line. The valve may be structured to allow the reductant to pass therethrough to the reductant storage tank 110 if an operating pressure of the reductant generated by the pump exceeds a predetermined pressure so as to prevent over pressurizing of the pump, the reductant delivery lines, or other components of the reductant insertion assembly 112. In some embodiments, the bypass line may be configured to allow the return of the reductant to the reductant storage tank 110 during purging of the reductant insertion assembly 112 (e.g., after the aftertreatment system 100 is shut off).

In various embodiments, the reductant insertion assembly 112 may also comprise a blending chamber structured to receive pressurized reductant from a metering valve at a controllable rate. The blending chamber may also be structured to receive air, or any other inert gas (e.g., nitrogen), for example from an air supply unit so as to deliver a combined flow of the air and the reductant to the exhaust conduit 102 through the injector 130.

The injector 130 is operable to inject or otherwise insert the reductant (e.g., a reductant stream or spray) into an exhaust gas flow path of the exhaust conduit 102 through the mounting plate 120. In various embodiments in which the mounting plate 120 includes a plurality of mounting plate openings, a plurality of injectors 130 can be positioned on the mounting plate 120. Each of the plurality of injectors 130 can be in fluid communication with at least one of the plurality of mounting plate openings of the mounting plate 120 so that multiple streams or sprays of reductant are inserted into the exhaust conduit 102 through the mounting plate 120 as described herein.

The mounting plate 120 can be formed from any suitable material, for example, metals such as stainless steel, iron, etc., and formed from using any suitable process, for casting, forming, etc. In various embodiments, the mounting plate 120 can be include a first portion and a second portion which are coupled together, for example, welded together to form the mounting plate 120.

The first mixer 140 is positioned in the exhaust conduit 102 upstream of the SCR system 160 and downstream of the mounting plate 120. The first mixer 140 may include a tab mixer, a baffle plate, any other mixer, or a combination thereof. The first mixer 140 may be structured to redistribute reductant droplets over an entire cross-section of the exhaust conduit 102 so as to enhance mixing of the reductant with the exhaust gas. The second mixer 150 may be positioned downstream of the first mixer 140 and upstream of the SCR system 160. The second mixer 150 may comprise a swirl generating mixer structured to introduce swirls in the exhaust gas flow so as to enhance mixing of the reductant with the exhaust gas. The second mixer 150 may include plates, vanes, sidewalls, vortex generators, turbulence generator passageways, bluffs or any other features structured to generate the swirls to enhance mixing of the reductant with the exhaust gas.

The first mixer 140 is structured to have a first natural frequency, and the second mixer 150 is structured to have a second natural frequency (collectively referred to herein as "the natural frequency") matching the pressure pulsation frequency. This causes resonant vibration in the first mixer 140 and/or the second mixer 150, causing reductant deposits to be removed from the first mixer 140 and/or the second mixer 150. For example, each of the first mixer 140 and the second mixer 150 may be designed to have a natural frequency (e.g., at least one mode of vibration), which matches a predetermined pressure pulsation frequency of the exhaust gas.

As described above, the pressure pulsation frequency is dependent on the engine operating parameters, and may vary based on the operating map of the engine 10. The desired operating point for the resonant vibration may be determined for the specific application, based on one or more operating parameters of the engine 10, which define the reductant deposit risk. For example, from the operating map of the engine 10, it can be determined what region the duty cycle produces the most prominent pressure pulsation frequency, which provides a forcing frequency dwell time opportunity, and where reductant deposit risk is the greatest (e.g., at elevated dosing rates, lower exhaust temperatures and flows, etc.). The corresponding pressure pulsation frequency may be chosen to design the natural frequency of the first mixer 140 and/or the second mixer 150 to match therewith.

For example, once the desired pressure pulsation frequency is identified, a design of the first mixer 140 and/or the second mixer 150 may be tuned via using structural analysis tools (e.g., finite element analysis (FEM)). Structural features such as geometry of vanes, fins or baffles, material thickness, material mechanical properties, etc. may be optimized around the natural frequency (e.g., a component first mode natural frequency) of the first mixer 140 and the second mixer 150 to match the desired pressure pulsation frequency which serves as an excitation frequency causing resonant vibration in the first mixer 140 and the second mixer 150. Furthermore, the first mixer 140 and the second mixer 150 may be structured to have sufficient elasticity and strength such that the resonant vibration causes minimal material fatigue, so as to have negligible impact on the structural integrity of the first mixer 140 and the second mixer 150.

In some embodiments, the aftertreatment system 100 may include vibration damping features to urge the natural frequency of the first mixer 140 and/or the second mixer 150 towards the desired pressure pulsation frequency, and/or prevent excessive deflection of the first mixer 140 and/or the second mixer 150 at resonance. In particular embodiments, the first mixer 140 is coupled to the exhaust conduit 102 via a first weld joint 143. Similarly, the second mixer 150 may also be coupled to the exhaust conduit 102 via a second weld joint 153. The first weld joint 143, and the second weld joint 153 may be structured to damp the natural frequency of the first mixer 140 and the second mixer 150, respectively so as to urge the natural frequency towards the pressure pulsation frequency.

In other embodiments, an insulation 108 may be positioned on a sidewall of the exhaust conduit 102. The insulation 108 may comprise a fiber glass sheet, a fiber glass blanket, wool, polystyrene, any other insulation or a combination thereof. A thickness of the insulation 108 may be chosen so as to damp the natural frequency of the first mixer 140 and/or the second mixer 150 and urge the natural frequency towards the pressure pulsation frequency.

In still other embodiments, one or more operating parameters of the engine 10 may be varied to urge the pressure pulsation frequency towards the natural frequency of the first mixer 140 and/or the second mixer 150. For example, the first mixer 140 and the second mixer 150 may be structured such that their natural frequency matches a pressure pulsation frequency of the exhaust gas produced at low engine speeds, at high engine speeds, at idle conditions, or any other suitable operating conditions of the engine 10. In particular embodiments, under idle conditions a speed of the engine 10 may be increased so as to urge the pressure pulsation frequency towards the natural frequency of the first mixer 140 and/or the second mixer 150 and cause the resonant vibration.

For example, a controller 170 may be operatively coupled to the engine 10. The controller 170 may comprise any suitable controller, for example the computing device 570. In some embodiments, the aftertreatment system 100 comprises a frequency sensor 104 positioned within the exhaust conduit 102, and configured to generate a frequency signal indicative of the pressure pulsation frequency. The controller 170 may also be operatively coupled to the frequency sensor 104 so as to receive and interpret the frequency signal and determine the pressure pulsation frequency therefrom.

The controller 170 may be configured to control one or more of the operating parameters of the engine 10 (e.g., engine speed, engine torque, etc.) so as to urge the engine 10 towards an operating condition where the pressure pulsation frequency matches the natural frequency of the first mixer 140 and/or the second mixer 150. For example, the controller 170 may be configured to receive the frequency signal from the frequency sensor 104, and determines the pressure pulsation frequency therefrom.

In response to an engine operating condition being suitable for adjusting an engine operating parameter (e.g., an idle condition, or prior to engine shutdown), the controller 170 may adjust the engine parameters to urge the pressure pulsation frequency towards the natural frequency of the first mixer 140 and/or the second mixer 150. After a predetermined time period (e.g., 30 seconds, 1 minute, 2 minutes, 3 minutes, 4 minute, 5 minute, or any other suitable time period) the controller 170 may readjust the engine operating parameters so as to move the pressure pulsation frequency away from the natural frequency, and towards normal operation.

In other embodiments, the aftertreatment system 100 may also comprise a first mechanical actuator 141 operably coupled to the first mixer 140. The first mechanical actuator 141 may be configured to selectively generate a first vibration having a first frequency matching the natural frequency of the first mixer 140. Similarly, a second mechanical actuator 151 may be operably coupled to the second mixer 150, and configured to selectively generate a second vibration having a second frequency matching the natural frequency of the second mixer 150.

The controller 170 may be operatively coupled to each of the first mechanical actuator 141 and the second mechanical actuator 151. The controller 170 may selectively generate a frequency generation signal causing the first mechanical actuator 141, and the second mechanical actuator 151 to generate the first vibration having a first frequency and the second vibration having the second frequency matching the natural frequency of the first mixer 140 and the second mixer 150, respectively. This causes resonance in the first mixer 140 and the second mixer 150 so as to remove any reductant deposits therefrom.

Figure 2:
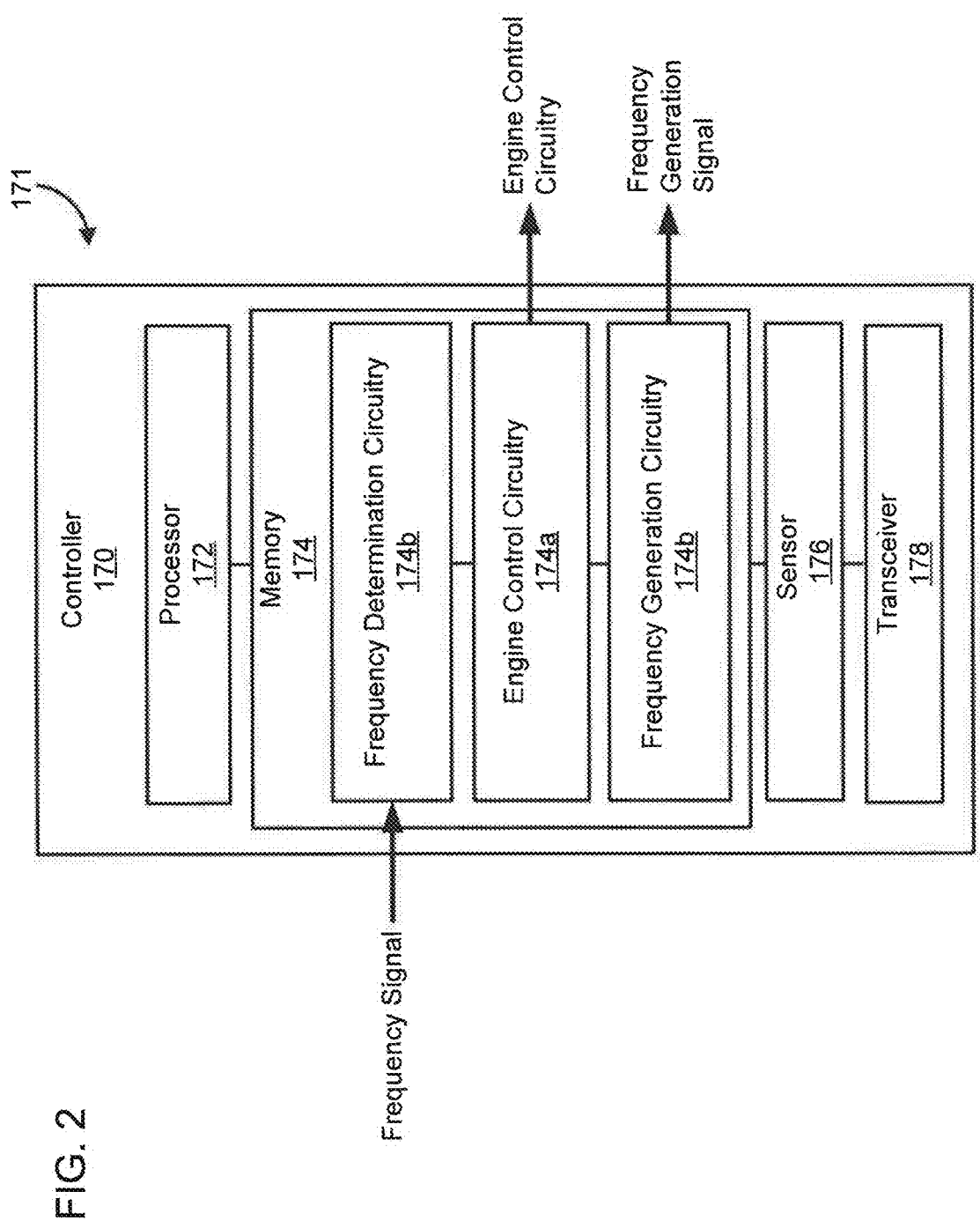
FIG. 2 is a schematic block diagram of a controller that may be included in the aftertreatment system of FIG. 1.

In particular embodiments, the controller 170 may be included in a control circuitry. For example, FIG. 2 is a schematic block diagram of a control circuitry 171 that comprises the controller 170, according to an embodiment. The controller 170 comprises a processor 172, a memory 174, or any other computer readable medium, a transceiver 178, and a sensor 176. It should be understood that the controller 170 shows only one embodiment of the controller 170 and any other controller capable of performing the operations described herein can be used.

The processor 172 may comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

For example, the memory 174 may comprise a frequency determination circuitry 174a, an engine control circuitry 174b and a frequency generation circuitry 174c. The frequency determination circuitry 174a may be configured to receive a frequency signal (e.g., via the sensor 176) from the frequency sensor 104 and determine the pressure pulsation frequency therefrom.

The engine control circuitry 174b may be configured to generate an engine control signal. The engine control signal is communicated to the engine 10 (e.g., via the transceiver 178) and is configured to adjust one or more operating parameters of the engine 10, for example, responsive to the frequency signal so as to urge the pressure pulsation frequency towards the natural frequency of the first mixer 140 and/or the second mixer 150.

In particular embodiments, in which the first mechanical actuator 141 and the second mechanical actuator 151 are operably coupled to the first mixer 140 and the second mixer 150, the frequency generation circuitry 174c may be configured to generate a frequency generation signal. The frequency generation signal is communicated to the first mechanical actuator 141 and/or the second mechanical actuator 151 (e.g., via the transceiver 178) causing the first mechanical actuator 141 and the second mechanical actuator 151 to generate the first frequency and the second frequency, respectively. The first frequency and the second frequency match the natural frequency of the first mixer 140 and the second mixer 150, respectively and cause resonant vibration therein, thereby removing any reductant deposits built up thereon.

Figure 3:
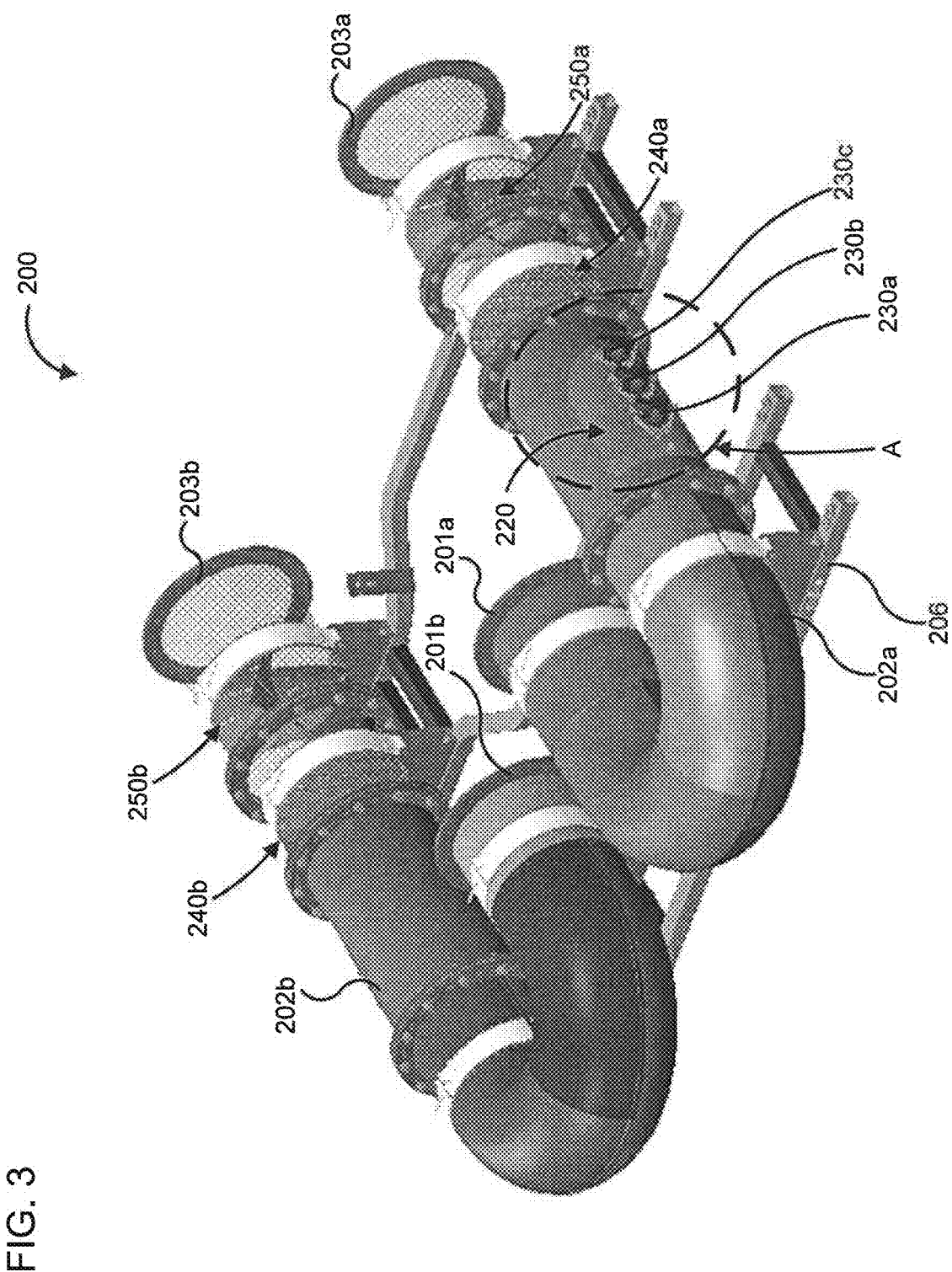
FIG. 3 is a perspective view of a portion of another embodiment of an aftertreatment system.

FIG. 3 is a perspective view of a portion of an aftertreatment system 200, according to another embodiment. The aftertreatment system 200 includes a first aftertreatment bank 200a and a second aftertreatment bank 200b which are substantially similar to each other. The aftertreatment system 200 is configured to receive an exhaust gas (e.g., a diesel exhaust gas) from an engine, for example the engine 10 and decompose constituents (e.g., NOx gases) included in the exhaust gas produced by the engine.

Figure 6:
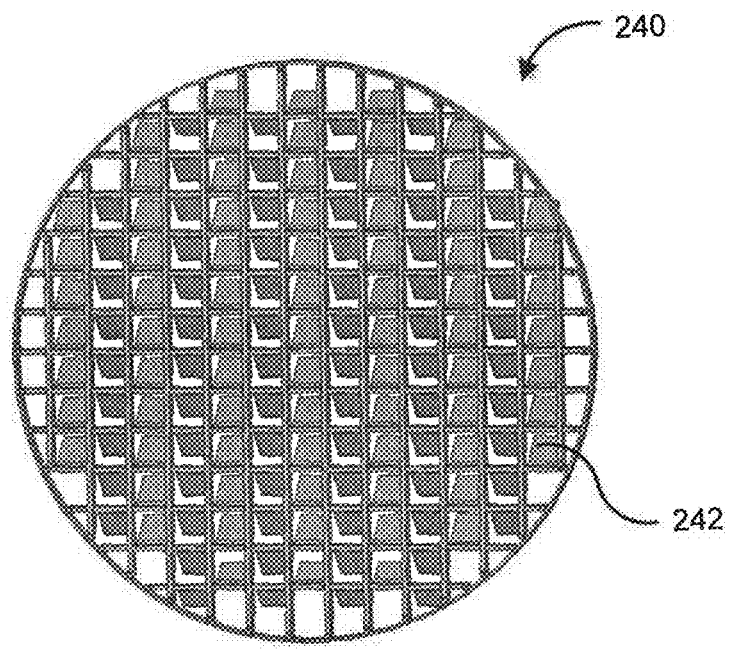
FIG. 6 is a front view of a second mixer which may be positioned in the exhaust conduit of FIG. 3, according to an embodiment.
Figure 7:
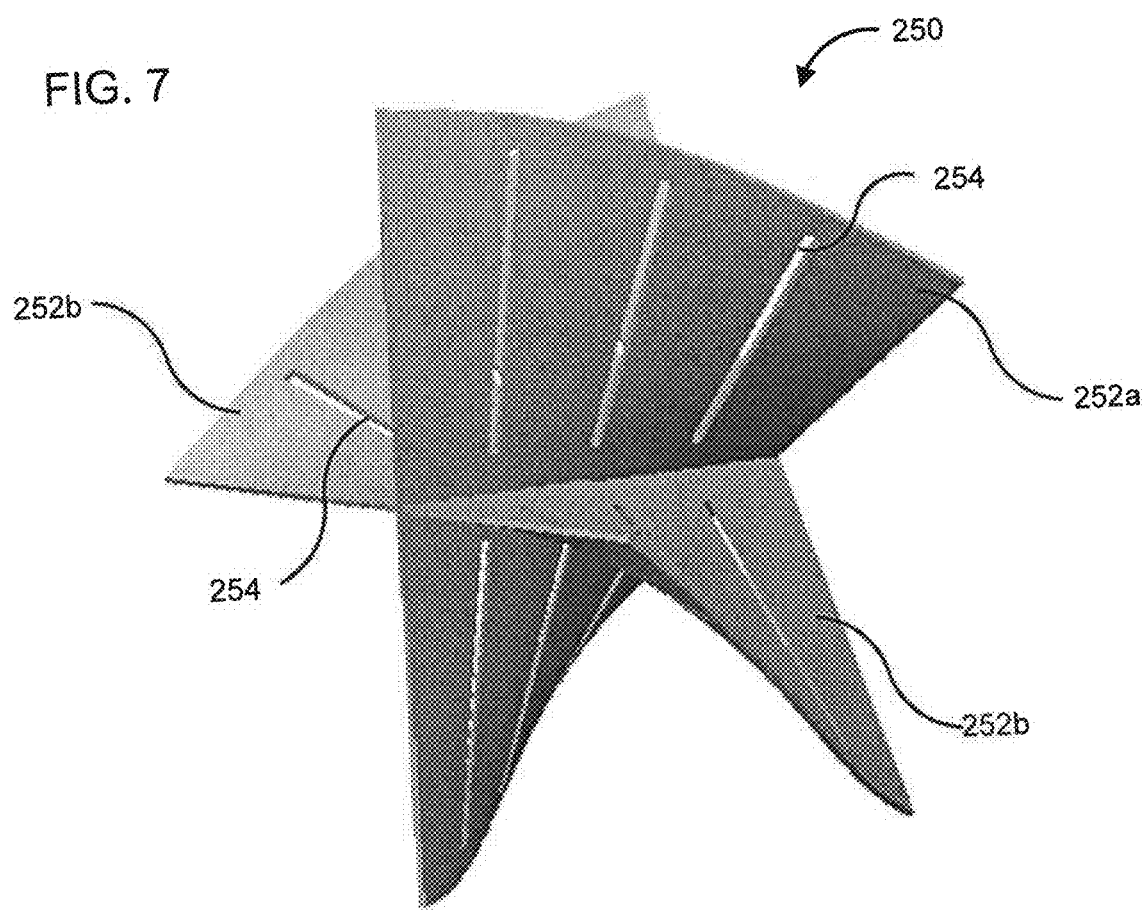
FIG. 7 is a perspective view of a second mixer which may be positioned in the exhaust conduit of FIG. 3, according to a particular embodiment.
Figure 8:
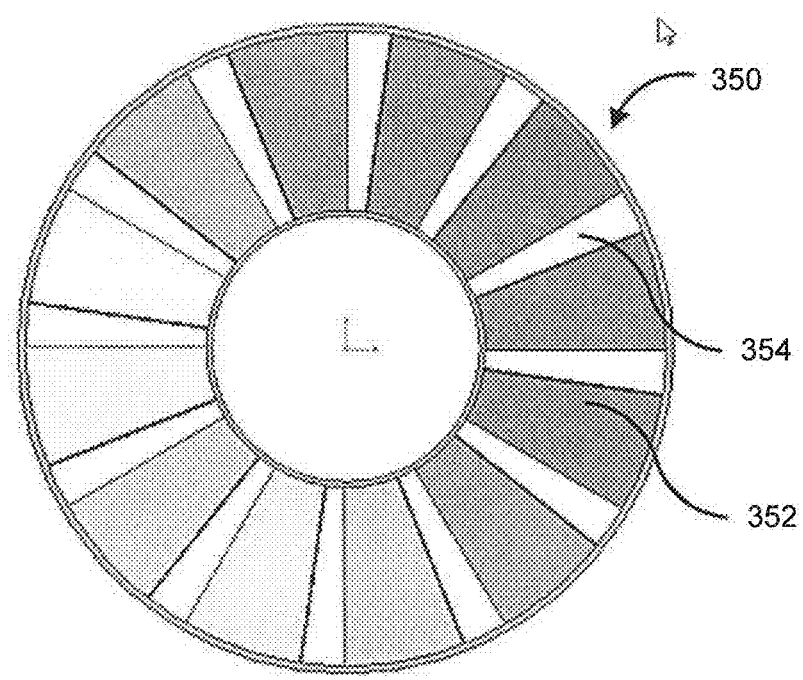
FIG. 8 is a front view of a second mixer which may positioned in the exhaust conduit of FIG. 3, according to another embodiment.

Each of the first aftertreatment bank 200a and the second aftertreatment bank 200b of the aftertreatment system 200 includes an exhaust conduit 202, a mounting plate 220, a first injector 230a, a second injector 230b and a third injector 230c (collectively referred to herein as "the injectors 230"), a first mixer 240a/b and a second mixer 250a/b (see. FIGS. 6-8). The aftertreatment system 200 can also include one more components such as, for example, an SCR system (e.g., the SCR system 160) included in each of the first and second aftertreatment banks 200a and 200b of the aftertreatment system 200, or structured to receive the exhaust gas from each of the first aftertreatment bank 200a and the second aftertreatment bank 200b of the aftertreatment system 200.

The exhaust conduit 202 includes an inlet 201 structured to couple to an engine (e.g., the engine 10) to receive an exhaust gas (e.g., a diesel exhaust gas) therefrom. The first mixer 240 is positioned downstream of the inlet 201. FIG. 3 shows the exhaust conduits 202 included in the first aftertreatment bank 200a and the second aftertreatment bank 200b as having a substantially "U-shape" so that the exhaust gas entering the exhaust conduit 202 via the inlet 201 is redirected at an angle of about 180 degrees to the first mixer 240.

In other embodiments, the exhaust conduits 202 can be substantially straight, curved, bent angled or have any other suitable shape. Each of the exhaust conduits 202, the first mixer 240 and the second mixer 250 are mounted on a frame 206. The frame 206 can include cross bars, rods, coupling means (e.g., apertures or throughholes to receive fasteners or welding sites) or any other securing mechanism to allow securing of the exhaust conduits 202, the first mixer 240, the second mixer 250 and/or any other component of the aftertreatment system 200 thereon.

Figure 4:
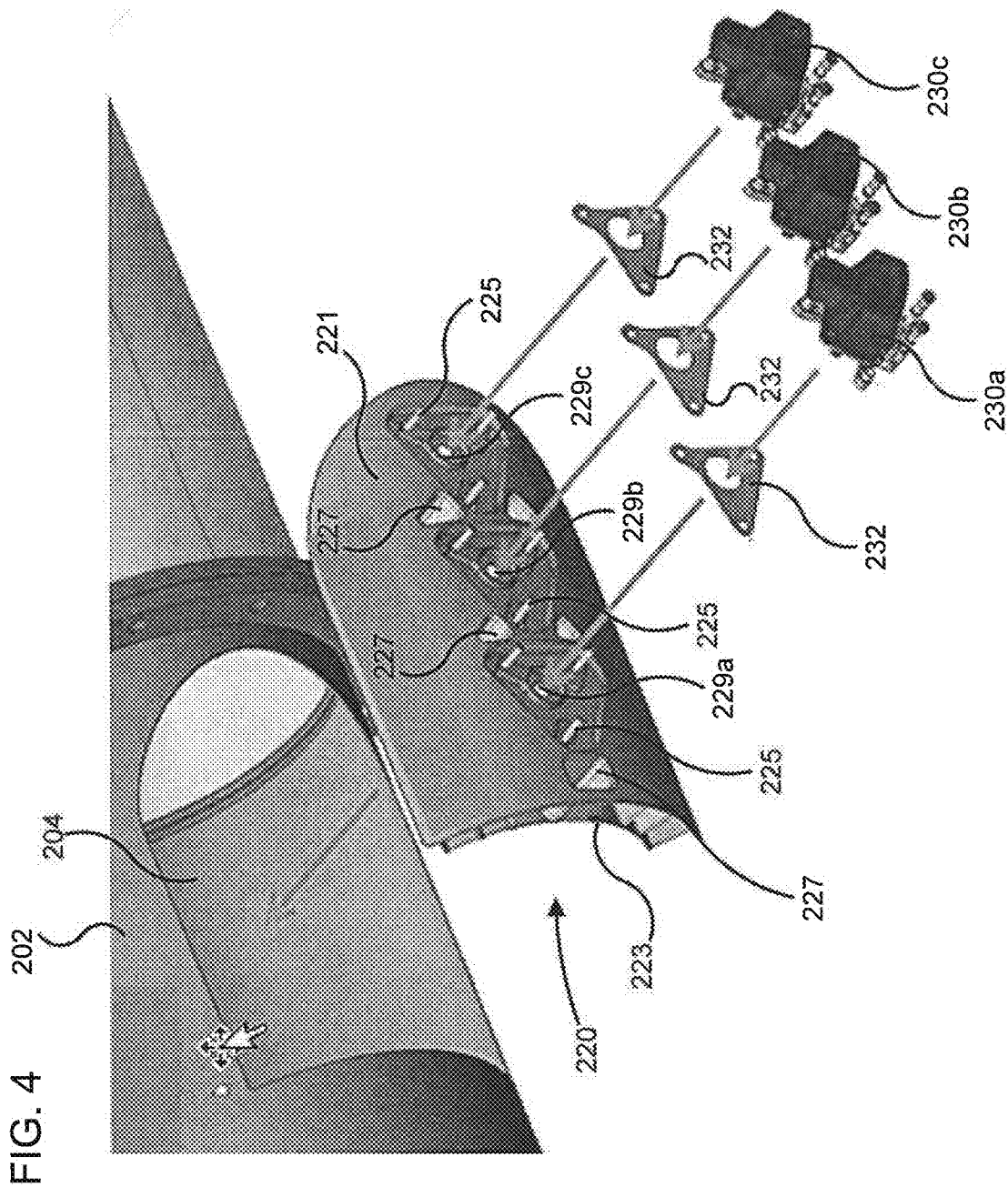
FIG. 4 is an enlarged view of a portion of the aftertreatment system of FIG. 2, with the arrow A in FIG. 3 showing a mounting plate mounted on the exhaust conduit removed from the exhaust conduit.

FIG. 4 is an enlarged view of the portion of the exhaust conduit 202 indicated by the arrow A in FIG. 3. An exhaust conduit opening 204 is defined on a sidewall of the exhaust conduit 202 within which the mounting plate 220 is positioned. The mounting plate 220 includes a first portion 221 and a second portion 223 which are coupled together (e.g., welded, screwed, fastened, fusion bonded, coupled using adhesives, etc.) to form the mounting plate 220. The mounting plate 220 can be coupled to the exhaust conduit opening 204 defined in the exhaust conduit 202 using any suitable coupling means, for example, welded (e.g., arc welded, spot welded, gas welded, heat welded, etc.), fusion bonded, joined with an adhesive or snap-fit or coupled using fasteners (e.g., screws, bolts, rivets, etc.). The coupling of the mounting plate 220 to the sidewall of the exhaust conduit 202 forms a substantially leak tight seal so that the exhaust gas cannot escape from the joint between the mounting plate 220 and the exhaust conduit opening 204, as described before herein. In various embodiments, the mounting plate 220 can be monolithically formed, for example, casted.

The mounting plate 220 can be formed from any suitable material, for example, metals such as stainless steel, iron, etc., and formed from using any suitable process, for example casting, forming, stamping etc. The mounting plate 220 includes a first mounting plate opening 229a, a second mounting plate opening 229b and a third mounting plate opening 229c (collectively referred to herein as "the plurality of mounting plate openings 229") defined in the first portion 221 and the second portion 223 of the mounting plate 220 so that the plurality of mounting plate openings 229 are defined through the mounting plate 220. The plurality of mounting plate openings 229 are positioned parallel to each other along a longitudinal axis of the mounting plate 220 which can be substantially parallel to an exhaust gas flow path of the exhaust gas flowing through the exhaust conduit 202. A first injector 230a, a second injector 230b and a third injector 230c (collectively referred to herein as the "plurality of injectors 230") are positioned on the first portion 221 of the mounting plate 220 and fluidly coupled to the first mounting plate opening 229a, the second mounting plate opening 229b and the third mounting plate opening 229c, respectively configured to insert reductant through the corresponding mounting plate opening 229.

Mounting features 225 are defined on the first portion 221 of the mounting plate 220 proximate to each of the plurality of mounting plate openings 229. The mounting features 225 can include, for example pins, apertures, throughholes (e.g., threaded throughholes), grooves, notches, indents, detents, slots or any other suitable mounting features for securely mounting or coupling the plurality of injectors 230 on the first portion 221 of the mounting plate 220. A gasket 232 is positioned between each of the plurality of injectors 230 and first portion 221. Each of the gaskets 232 are positioned around each of the plurality of mounting plate openings 229 and structured to provide a leak tight seal between of the plurality of injectors 230 and the corresponding mounting plate opening 229 so as to prevent the reductant from leaking from between the plurality of injectors 230 and the plurality of mounting plate openings 229.

Figure 5:
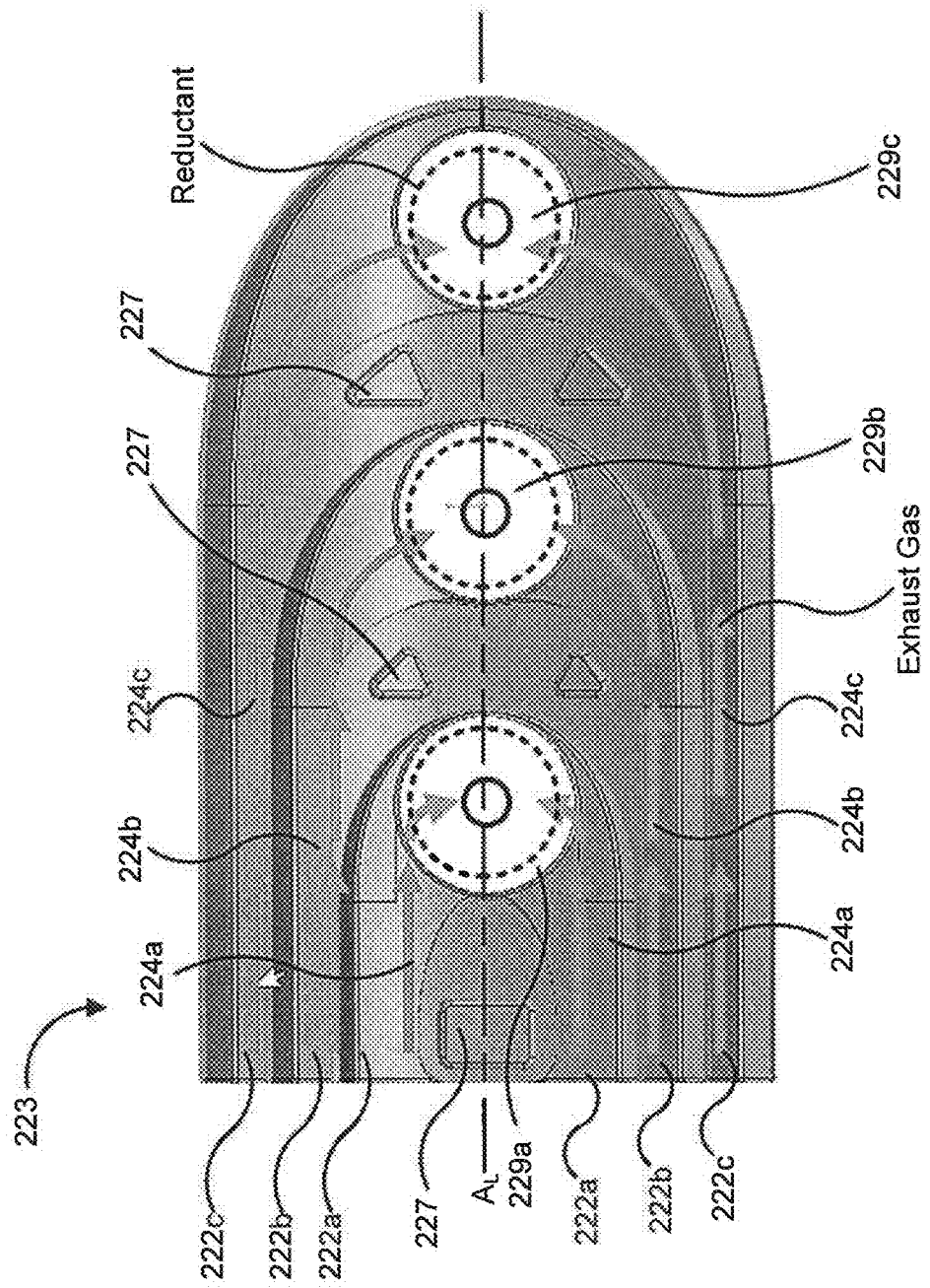
FIG. 5 is a cross-section view of the mounting plate of FIGS. 2 and 3 showing a plurality of fluid channels defined therewithin.

Each of the plurality of injectors 230 are configured to insert the reductant, for example, any reductant as described with respect to the aftertreatment system 100 into the respective mounting plate opening 229 of the plurality of mounting plate opening 229 so that at least 3 streams of reductant are inserted through the mounting plate 220 into an exhaust gas flow path of the exhaust conduit 202, as described herein. FIG. 5 is a front view of the second portion 223 (bottom) of the mounting plate 220. The first mounting plate opening 229a, the second mounting plate opening 229b and the third mounting plate opening 229c are defined through the bottom portion so that the reductant inserted by the plurality of injectors 230 is inserted through the mounting plate 220. A first pair of fluid channels 224a, a second pair of fluid channels 224b and a third pair of fluid channels 224c (collectively referred to herein as the "pairs of fluid channels 224") are defined in the second portion 223 and/or the first portion 221.

The first pair of fluid channels 224a includes a first inlet 222a, the second pair of fluid channels 224b include a second inlet 222b and the third pair of fluid channels 224c include a third inlet 222c (collective referred to herein as "the inlets 222.") The inlets 222 are structured to receive and direct a portion of the exhaust gas through the pairs of fluid channels 224. The pairs of fluid channels 224 are fluidly connected to a respective mounting plate opening 229 of the plurality of mounting plate openings 229 so that pairs of exhaust gas streams are directed through the pairs of fluid channels 224 towards the respective mounting plate opening 229.

As shown in FIG. 5 the plurality of mounting plate openings 229 are positioned parallel to each other and along a longitudinal axis $A_L$ of the mounting plate 220. Furthermore, the pairs of fluid channels 224 are also positioned parallel to each other. The first pair of fluid channels 224a are positioned parallel to each other and proximate to the longitudinal axis $A_L$ and on either side of the longitudinal axis $A_L$. The second pair of fluid channels 224b are positioned parallel to each other distal from the longitudinal axis $A_L$ relative to the first pair of fluid channels 224a and on either side of the first pair of fluid channels 224a. Furthermore, the third pair of fluid channels 224c are also positioned parallel to each other distal most from the longitudinal axis $A_L$ on either side of the second pair of fluid channels 224b.

The pairs of fluid channels 224 can be defined only in the second portion 223 or in each of the first portion 221 and the second portion 223 of the mounting plate 220. A plurality of alignment features 227 which include pairs of uniquely shaped grooves and protrusions are defined in each of the first portion 221 and the second portion 223 of the mounting plate 220. The plurality of alignment features 227 can be used to align the first portion 221 with the second portion 223 to facilitate a desired positioning the pairs of fluid channels 224 and the plurality of mounting plate openings 229 relative to each other once the first portion 221 is coupled to the second portion 223 to form the mounting plate 220.

As shown in FIG. 5, each of the pairs of fluid channels 224 divide exhaust gas flowing into the mounting plate 220 into two exhaust gas streams or pair of exhaust gas streams. Each of the pair of fluid channels 224 include a curved portion leading to a respective mounting plate opening 229. The pairs of fluid channels 224 are structured to direct the pair of exhaust gas streams from each of the plurality of inlets 222 to a respective mounting plate opening 229 of the plurality of mounting plate openings 229 so that the pair of exhaust gas streams arrive at the respective mounting plate opening 229 from different directions.

The pairs of fluid channels 224 are structured so that the pair of exhaust gas streams arrive at the respective mounting plate opening 229 in opposite directions, i.e., at an angle of 180 degrees relative to each other. In other embodiments, the pair of fluid channels 224 can be structured so that the pair of exhaust gas streams arrive at the outlet at any other angle relative to each other, for example 30 degrees, 45 degrees, 60 degrees, 75 degrees, 90 degrees, 105 degrees, 120 degrees, 135 degrees, 150 degrees or 165 degrees relative to each other.

Inserting of the pair of exhaust gas streams in different directions, for example opposite directions via the pairs of fluid channels 224 cause the pair of exhaust gas streams to arrive at the respective mounting plate opening 229 from the opposite directions and combine with the reductant inserted through the respective mounting plate openings 229 before being inserted into an exhaust gas flow path defined by the exhaust conduit 202. The exhaust gas assisted insertion of the reductant into the exhaust gas flow path through the mounting plate 220 via the mounting plate openings 229 greatly reduces a shearing effect of the exhaust gas flow at the mounting plate openings 229.

The combining of the pair of exhaust gas streams with the reductant before being inserted into the exhaust gas flow path can generate a transverse flow of the exhaust reductant in the exhaust gas flow path. The transverse flow can increase penetration of the droplets or otherwise spray of the reductant into the exhaust gas flowing through the exhaust conduit 202. Inserting the reductant through the mounting plate 220 reduces interference between multiple reductant streams or sprays inserted by a plurality of injectors 230 mounted on the mounting plate 220. The combining of the pair of exhaust gas streams with the reductant to insert the reductant into the exhaust gas flow path through the mounting plate openings 229 also reduces the size of the droplets forming the reductant spray inserted into the exhaust gas flow path, thereby enhancing mixing of the reductant with the exhaust gas.

Referring to FIG. 3, first mixers 240a/b (collectively referred to herein as the "first mixer 240") are positioned in the exhaust conduit 202a/b downstream of the mounting plate 220. FIG. 6 shows a front view of the first mixer 240. The first mixer 240 includes a tab mixer that includes a plurality of tabs 241 structured to distribute the flow over the cross-section of the exhaust conduit 202 and/or reduce a droplet size of the reductant. The first mixer 240 is structured to have a first natural frequency matching a pressure pulsation frequency of the exhaust gas flowing through the exhaust conduit 202 so as to cause resonant vibration in the first mixer 240 causing reductant deposits to be removed from the first mixer 240.

A second mixer 250 is positioned downstream of the first mixer 240 and includes a swirl generating device structured to generate swirls in the exhaust gas. This increases the residence time of the reductant and the exhaust gas in the exhaust conduit 202, thereby enhancing the mixing of the exhaust gas with the reductant.

FIG. 7 shows a second mixer 250, according to a particular embodiment. The second mixer 250 comprises a first swirl generating plate 252a and a second swirl generating plate 252b (collectively referred to herein as "the swirl generating plates 252"), positioned perpendicular to the first swirl generating plate 252a. The swirl generating plates 252 intersect at their midpoints, and define a continuous curvature structured to generate swirls in the exhaust gas flowing through the exhaust conduit 202. A plurality of longitudinal slits 254 are also defined at predetermined locations on the swirl generating plates 252, which may also facilitate swirl generation. Furthermore, the second mixer 250 is structured to have a second natural frequency matching the pressure pulsation frequency of the exhaust gas so as to generate resonant vibration in the second mixer 250 causing reductant deposits to be removed from the second mixer 250.

FIG. 8 is a front view of a second mixer 350 which may be included in the exhaust conduit 202 of the aftertreatment system 200, according to another embodiment. The second mixer 350 includes vanes 352 having a plurality of openings 354 therebetween. The second mixer 350 is structured to create swirls or vortex in the exhaust gas flow including the reductant mixed therein. Furthermore, the second mixer 350 may be structured to have a natural frequency matching the pressure pulsation frequency, as described herein.

Figure 9:
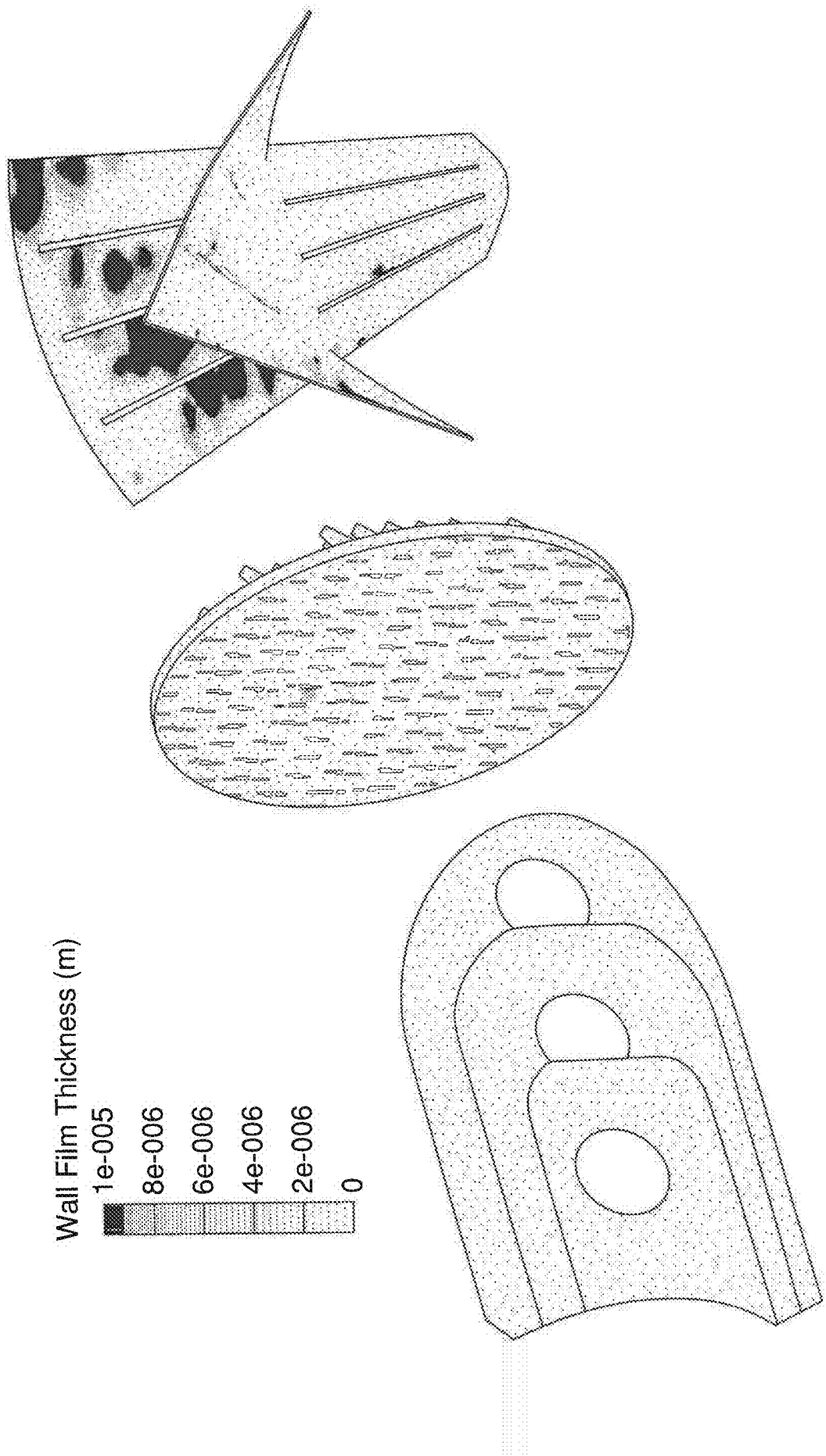
FIG. 9 is finite element analysis (FEM) simulations for tuning of the natural frequency of the first mixer and the second mixer to match a pressure pulsation frequency of an exhaust gas.

FIG. 9 are FEM analysis of a mounting plate (e.g., the mounting plate 220), a first mixer (e.g. the first mixer 240), and second mixer (e.g., the second mixer 250). Using FEM analysis, various features, for example material thickness, vane angles, number of tabs, number and/or width of slits and openings, etc. may be adjusted so as to match the natural frequency of the first mixer and the second mixer to the pressure pulsation frequency.

Figure 10:
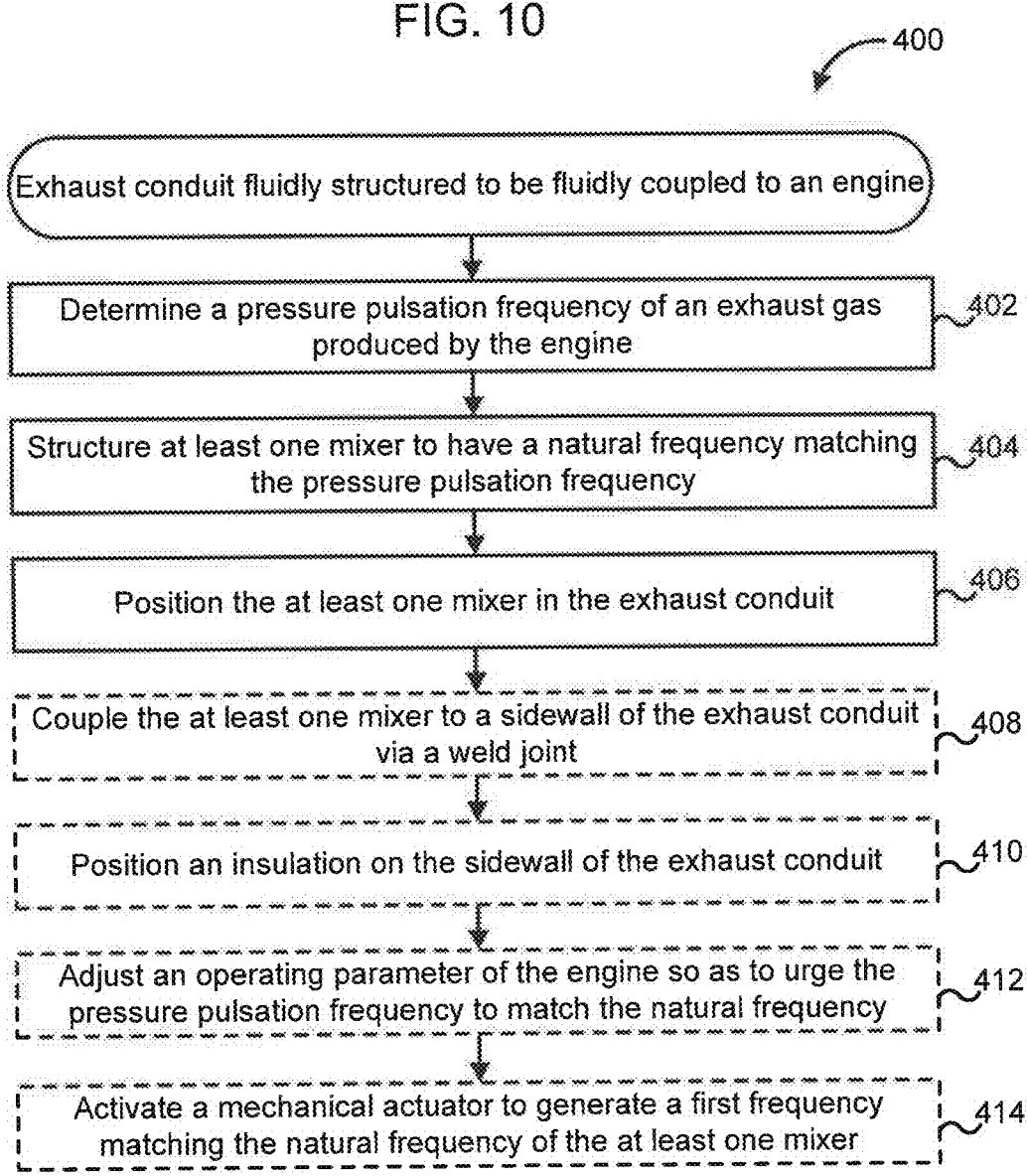
FIG. 10 is a schematic flow diagram of an embodiment of a method for removing reductant deposits from mixers included in an aftertreatment system.

FIG. 10 is a schematic flow diagram of an example method 400 for reducing reductant deposits in an exhaust conduit (e.g., the exhaust conduit 102, 202) including at least one mixer (e.g., the first mixer 140, 240 and/or the second mixer 150, 250). The exhaust conduit is structured to be fluidly coupled to an engine (e.g., the engine 10).

The method 400 comprises determining the pressure pulsation frequency of the exhaust gas produced by the engine, at 402. For example, a pressure pulsation frequency of the exhaust gas produced by the engine 10 may be determined at various operating parameters of the engine 10. The pressure pulsation frequency at a particular operating parameter (e.g., determined from an operating map of the engine) may be selected as the desired pressure pulsating frequency of the engine 10.

The at least one mixer is structured to have a natural frequency matching the pressure pulsating frequency, at 404. For example, the first mixer 140, 240 and/or the second mixer 150, 250 may be structured to have a natural frequency matching the pressure pulsation frequency, as previously described herein. The at least one mixer is positioned in the exhaust conduit, at 406. For example, the first mixer 140, 240 and/or the second mixer 150, 250 is positioned in the exhaust conduit 102, 202.

In some embodiments, the at least one mixer is coupled to a sidewall of the exhaust conduit via a weld joint, at 408. For example, the weld joint (e.g., the first weld joint 143 or the second weld joint 153) may be used to weld the at least one mixer (e.g., the first mixer 140 and/or the second mixer 150) to the exhaust conduit (e.g., the exhaust conduit 102, 202). The weld joint may be structured to damp the natural frequency of the at least one mixer so as to urge the natural frequency of the at least one mixer towards the pressure pulsation frequency.

In another embodiment, an insulation may be positioned on the sidewall of the exhaust conduit, at 410. For example, the insulation 108 may be positioned on the sidewall of the exhaust conduit 102, 202. A thickness of the insulation 108 may be chosen so as to damp the natural frequency of the first mixer 140, 240 and/or the second mixer 150, 250 and urge the natural frequency towards the pressure pulsation frequency.

In still another embodiment, an operating parameter of the engine may be adjusted to urge the pressure pulsation frequency of the exhaust gas towards the natural frequency of the at least one mixer, at 412. For example, the controller 170 may adjust one or more operating parameters of the engine 10, for example, the engine speed, torque, etc. so as to adjust the pressure pulsation frequency of the exhaust gas towards the natural frequency of the first mixer 140, 240 and/or the second mixer 150, 250.

In yet another embodiment, a mechanical actuator is activated to generate a first frequency matching the natural frequency of the at least one mixer, at 414. For example, the controller 170 may communicate the frequency generation signal to activate the first mechanical actuator 141 and/or the second mechanical actuator 151. The first mechanical actuator 141 and the second mechanical actuator 151 generate the first frequency and the second frequency, respectively matching the natural frequency of the first mixer 140, 240 and the second mixer 150, 250, thereby producing resonant vibration therein so as to remove any reductant deposits thereon.

Figure 11:
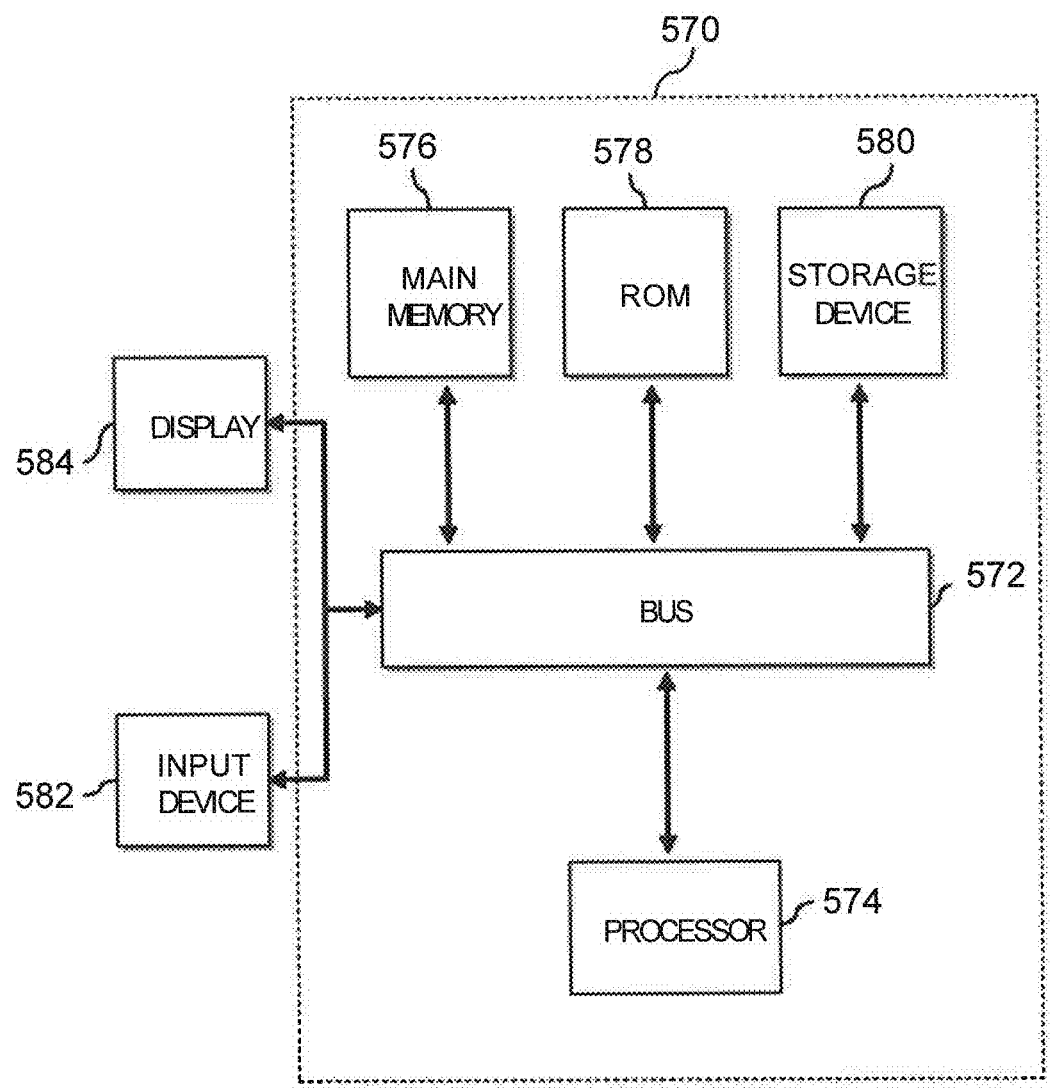
FIG. 11 is a schematic block diagram of a computing device, which may be used as the controller of FIGS. 1 and/or 2.

In some embodiments, the controller 170, the control circuitry 171, or any of the controller or control circuitries described herein can comprise a system computer of an apparatus or system which comprises the aftertreatment system 100 (e.g., a vehicle, an engine or generator set, etc.). For example, FIG. 11 is a block diagram of a computing device 570 in accordance with an illustrative implementation. The computing device 570 can be used to perform any of the methods or the processes described herein, for example the method 400. In some embodiments, the controller 170 can comprise the computing device 570. The computing device 570 comprises a bus 572 or other communication component for communicating information. The computing device 570 can also comprise one or more processors 574 or processing circuits coupled to the bus 572 for processing information.

The computing device 570 also comprises main memory 576, such as a random access memory (RAM) or other dynamic storage device, coupled to the bus 572 for storing information and instructions to be executed by the processor 574. Main memory 576 can also be used for storing position information, temporary variables, or other intermediate information during execution of instructions by the processor 574. The computing device 570 may further comprise ROM 578 or other static storage device coupled to the bus 572 for storing static information and instructions for the processor 574. A storage device 580, such as a solid-state device, magnetic disk or optical disk, is coupled to the bus 572 for persistently storing information and instructions. For example, instructions corresponding operations of the method 400 can be stored on the storage device 580.

The computing device 570 may be coupled via the bus 572 to a display 584, such as a liquid crystal display or active matrix display, for displaying information to a user. An input device 582, such as a keyboard or alphanumeric pad, may be coupled to the bus 572 for communicating information and command selections to the processor 574. In another implementation, the input device 582 has a touch screen display 584.

According to various implementations, the processes and methods described herein can be implemented by the computing device 570 in response to the processor 574 executing an arrangement of instructions contained in main memory 576 (e.g., the operations of the method 400). Such instructions can be read into main memory 576 from another non-transitory computer-readable medium, such as the storage device 580. Execution of the arrangement of instructions contained in main memory 576 causes the computing device 570 to perform the illustrative processes described herein. One or more processors in a multi-processing arrangement may also be employed to execute the instructions contained in main memory 576. In alternative implementations, hard-wired circuitry may be used in place of or in combination with software instructions to effect illustrative implementations. Thus, implementations are not limited to any specific combination of hardware and software.

Although an example computing device 570 has been described in FIG. 11, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can comprise special purpose logic, e.g., an FPGA (field programmable gate array) or an ASIC (application-specific integrated circuit). In addition to hardware, the apparatus can also comprise code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, magneto-optical disks, or optical disks). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system for decomposing an exhaust gas produced by an engine, the aftertreatment system comprising:

a selective catalytic reduction system including at least one catalyst for decomposing constituents of the exhaust gas, the exhaust gas having a pressure pulsation frequency;

an exhaust conduit fluidly coupled to the selective catalytic reduction system and structured to deliver the exhaust gas to the selective catalytic reduction system from the engine;

at least one mixer positioned in the exhaust conduit, the at least one mixer comprising a swirl generating mixer that comprises:

a first swirl generating plate;

a second swirl generating plate coupled to the first swirl generating plate, the second swirl generating plate comprising a first arm extending from a central section of a first surface of the first plate in a first direction that is transverse to the first plate, and a second arm extending from a central section of a second surface of the first plate in a second direction that is transverse to the first plate, and a plurality of slits defined in each of the first swirl generating plate and the second swirl generating plate; and a reductant insertion assembly fluidly coupled to the exhaust conduit and structured to insert a reductant into the exhaust conduit upstream of the at least one mixer, wherein the at least one mixer is structured to have a natural frequency matching the pressure pulsation frequency so as to cause resonant vibration in the at least one mixer, the resonant vibration causing reductant deposits to be removed from the at least one mixer.

2. The aftertreatment system of claim 1, wherein the at least one mixer further comprises a baffle plate disposed upstream of the swirl generating mixer.

3. The aftertreatment system of claim 1, further comprising a mechanical actuator operably coupled to the at least one mixer, the mechanical actuator configured to selectively generate a first vibration having a first frequency matching the natural frequency of the at least one mixer.

4. The aftertreatment system of claim 1, wherein the at least one mixer is coupled to a sidewall of the exhaust conduit via a weld joint, the weld joint being structured to damp the natural frequency of the at least one mixer so as to urge the natural frequency towards the pressure pulsation frequency.

5. The aftertreatment system of claim 1, wherein an insulation is positioned on a sidewall of the exhaust conduit, a thickness of the insulation being sufficient to damp the natural frequency of the at least one mixer so as to urge the natural frequency towards the pressure pulsation frequency.

6. The aftertreatment system of claim 1, further comprising a mounting plate coupled to a sidewall of the exhaust conduit upstream of the at least one mixer, the mounting plate being structured to mount at least one reductant injector on the exhaust conduit.

7. An apparatus comprising:

an exhaust conduit configured to be fluidly coupled to a selective catalytic reduction system for delivering an exhaust gas thereto; and at least one mixer positioned in the exhaust conduit and configured to facilitate mixing of a reductant with the exhaust gas, the at least one mixer comprising a swirl generating mixer that comprises:

a first swirl generating plate;

a second swirl generating plate coupled to the first swirl generating plate, the second swirl generating plate comprising a first arm extending from a central section of a first surface of the first plate in a first direction that is transverse to the first plate, and a second arm extending from a central section of a second surface of the first plate in a second direction that is transverse to the first plate, and a plurality of slits defined in each of the first swirl generating plate and the second swirl generating plate, wherein the at least one mixer is structured to have a natural frequency matching a pressure pulsation frequency of the exhaust gas so as to cause resonant vibration in the at least one mixer, the resonant vibration causing reductant deposits to be removed from the at least one mixer.

8. The apparatus of claim 7, wherein the at least one mixer comprises a baffle plate disposed upstream of the swirl generating mixer.

9. The apparatus of claim 7, further comprising a mechanical actuator operably coupled to the at least one mixer, the mechanical actuator configured to selectively generate a first vibration having a first frequency matching the natural frequency of the at least one mixer.

10. The apparatus of claim 7, wherein the at least one mixer is coupled to a sidewall of the exhaust conduit via a weld joint, the weld joint structured to damp the natural frequency of the at least one mixer so as to urge the natural frequency towards the pressure pulsation frequency.

11. The apparatus of claim 7, wherein an insulation is positioned on a sidewall of the exhaust conduit, a thickness of the insulation being sufficient to damp the natural frequency of the at least one mixer so as to urge the natural frequency towards the pressure pulsation frequency.

12. A method comprising:

determining a pressure pulsation frequency of an exhaust gas produced by an engine;

structuring at least one mixer to have a natural frequency matching the pressure pulsation frequency, the at least one mixer comprising a swirl generating mixer that comprises:

a first swirl generating plate;

a second swirl generating plate coupled to the first swirl generating plate, the second swirl generating plate comprising a first arm extending from a central section of a first surface of the first plate in a first direction that is transverse to the first plate, and a second arm extending from a central section of a second surface of the first plate in a second direction that is transverse to the first plate, and a plurality of slits defined in each of the first swirl generating plate and the second swirl generating plate; and positioning the at least one mixer in an exhaust conduit configured to receive the exhaust gas, wherein the pressure pulsation frequency of the exhaust gas causes resonant vibration in the at least one mixer, the resonant vibration causing reductant deposits to be removed from the at least one mixer.

13. The method of claim 12, further comprising coupling the at least one mixer to a sidewall of the exhaust conduit via a weld joint, the weld joint being structured to damp the natural frequency of the at least one mixer so as to urge the natural frequency towards the pressure pulsation frequency.

14. The method of claim 12, further comprising;

coupling a mechanical actuator to the at least one mixer; and selectively activating the mechanical actuator to generate a first vibration having a first frequency matching the natural frequency of the at least one mixer.

15. The method of claim 12, further comprising positioning an insulation on a sidewall of the exhaust conduit, the insulation having a thickness sufficient to damp the natural frequency of the at least one mixer so as to urge the natural frequency towards the pressure pulsation frequency.

* * * * *